(12) United States Patent
Möller (10) Patent No.: US 12,429,371 B2
(45) Date of Patent: Sep. 30, 2025

(54) WEIGHING AND TRANSPORTING DEVICE AND METHOD FOR TRANSPORTING AND DETECTING MASS FLOW RATES OF BULK MATERIALS

(71) Applicant: CiTEX Holding GmbH, Melle (DE)

(72) Inventor: Jörg Möller, Bünde (DE)

(73) Assignee: CITEX Holding GmbH, Melle (DE)

( * ) Notice: Subject to any disclaimer, the term of this patent is extended or adjusted under 35 U.S.C. 154(b) by 171 days.

(21) Appl. No.: 17/984,715

(22) Filed: Nov. 10, 2022

(65) Prior Publication Data

US 2023/0152144 A1 May 18, 2023

(30) Foreign Application Priority Data

Nov. 12, 2021 (DE) ...................... 10 2021 129 497.5

(51) Int. Cl.
*G01G 13/295* (2006.01)
*B29C 48/285* (2019.01)
*B29C 48/92* (2019.01)

(52) U.S. Cl.
CPC ......... *G01G 13/295* (2013.01); *B29C 48/286* (2019.02); *B29C 48/288* (2019.02); *B29C 48/92* (2019.02); *B29C 2948/92161* (2019.02); *B29C 2948/9218* (2019.02); *B29C 2948/926* (2019.02)

(58) Field of Classification Search
CPC .. G01G 13/295; G01G 11/086; G01G 11/003; B29C 48/286; B29C 48/288; B29C 48/92; B29C 2948/92161; B29C 2948/9218; B29C 2948/926
See application file for complete search history.

(56) References Cited

U.S. PATENT DOCUMENTS

| 5,423,455 A | * | 6/1995 | Ricciardi | .................. B29B 7/60 73/434 |
| 5,450,984 A | * | 9/1995 | Rohr | ...................... G01G 13/24 222/64 |
| 2015/0377689 A1 | * | 12/2015 | Johnson | .................... G01F 1/86 73/1.16 |

* cited by examiner

*Primary Examiner* — Tarun Sinha
(74) *Attorney, Agent, or Firm* — Barnes & Thornburg LLP (57) ABSTRACT

The present disclosure relates to a weighing and transport device and a method for transporting and detecting mass flow rates of bulk material.
In filling cycles, a weighing container is closed at its upper inlet and lower outlet, whereupon bulk material id fed directly to the weighing container.
In weighing cycles, the upper inlet and the lower outlet are opened and the bulk material is discharged via an impact means, e.g., an impact cone.
A level sensor measures a filling level of the bulk material in the weighing container; an actuator serves to close the upper inlet and the lower outlet. Preferably, the lower outlet is closed by the impact means, and the upper inlet is closed by raising the weighing container against a support means, where, in particular, a common adjustment can be carried out via the actuator.

23 Claims, 3 Drawing Sheets

WEIGHING AND TRANSPORTING DEVICE AND METHOD FOR TRANSPORTING AND DETECTING MASS FLOW RATES OF BULK MATERIALS

PRIORITY CLAIM

This application claims to German Patent Application No. DE 10 2021 129 497.5, filed Nov. 12, 2021, which is expressly incorporated by reference herein.

BACKGROUND

The present disclosure relates to a weighing and transporting devices and a method for transporting and detecting mass flow rates of bulk material.

SUMMARY

According to the present disclosure, a weighing container enclosing a weighing container volume is closable at its upper inlet and lower outlet. At the upper end of the so closable weighing container the vacuum connection and the material suction coupling are connected. In the filling cycles the air stream with bulk material is fed, with the weighing container volume closed, directly to the weighing container volume. Thus, the weighing container itself is also used as receiving container or receptacle respectively (or "separator") for receiving the transported air stream with the bulk material.

To initiate a filling cycle the weighing container is closed at its upper inlet and lower outlet. Thereafter, in the filling cycle, the weighing container is filled with the bulk material up to a point where a suitable filling level is reached. Subsequently, the filling cycle is terminated and the weighing cycle is initiated. To initiate the weighing cycle the lower outlet and the upper inlet are opened so that the weighing container can subsequently discharge the contained bulk material continuously downwards, where it will be discharged via the impact means to a collecting hopper and from this to the transport region, e.g., directly to a barrel extruder or an upstream screw conveyor.

Thus, the weighing and transport device is small in size, in particular, in the vertical direction significantly smaller than comparative systems in which a storage container and suction conveyor system are mounted above the weighing device. The vacuum conveyor, which may be formed in the upper region, with a receiving container or material separator container respectively is combined functionally or integrated respectively with the downstream storage container and weighing container. This makes it possible to use it even in confined spaces, e.g., next to the extruder, so that a short feeding path to the extruder is made possible thereby providing a precise determination of mass throughput.

Moreover, a rapid change of materials is made possible because it is only the weighing container with downstream collecting hopper that is being filled. While, comparatively, the filled material separator container, storage container, and weighing container is emptied first, according to the present disclosure, it is possible to directly empty the weighing container with the collecting hopper and, e.g., another material can be fed in. This also allows, e.g., for a quicker change of colors, i.e., a change of the fed-in dye. Thus, corrections, e.g., in coloring can be carried out faster. This allows for a high degree of flexibility both in positioning as well as in material throughput.

Moreover, the technical equipment is smaller due to the omission of additional stages.

For closing the upper inlet and the lower outlet of the weighing container an actuator is provided. In principle, the actuator may be designed multi-piece and close the upper inlet using one actuator means and the lower outlet using a further actuator means. The actuator initially causes a relative adjustment, whereby, in particular, one closing means each may be adjusted at the top and/or at the bottom, and/or the weighing container may be adjusted upwards and/or downwards in relation to the closing means. Thus, it is possible, e.g., to also adjust the weighing container downwards so as to block the lower outlet.

According to one embodiment, a closing means is moved from below against the lower outlet, and then the weighing container with the closing means is adjusted upwards.

In illustrative embodiments, the impact means, e.g., an impact cone, is moved directly vertically against the lower outlet of the weighing container so that no additional closing means should be employed here. Thus, it is possible, in particular, to also use the actuator for this adjustment which anyway serves for adjusting an outlet gap between the lower outlet and the impact means and thereby, e.g., for adjusting for differing material shapes and sizes, e.g., granulate, flakes etc.

According to one embodiment, the weighing container is moved directly vertically upwards against a seal, in particular, a casket at an upper support means, thereby closing its upper inlet in a sealing manner.

According to one embodiment, the actuator of the impact means causes a common adjustment both of the impact means against the lower outlet and the weighing container upwards against the upper abutment at the support means. Hereby, in particular, a consistent adjustment motion of the actuator can be carried out, which initially moves the impact means against the lower outlet and subsequently presses the impact means with the material container upwards against the support means. Thus, only the common actuator, e.g., a pneumatic actuating cylinder, needs to be triggered to adjust into the filling position. Thus, s quick and secure adjustment is made possible at little additional expense, in particular, by means of the actuator use anyway to adjust the outlet gap.

The actuator actuates a drawbar which is guided from above through the support means vertically through the weighing container to the impact means, thus initially pressing the impact means against the lower outlet and subsequently taking along the weighing container.

As measuring signals, for one thing, a measuring force of weighing cells is detected whose temporal changes can be evaluated such as material throughput during the weighing cycle. To that end, the measuring cells housed at the support means may directly weigh the material container. Further, the measuring signal of a filling level sensor is detected which is formed, in particular, at the underside of the support means thereby detecting the filling level in the weighing container from above. Thus, both measuring means, the weighing cells and the level sensor, can be housed directly at the support means, e.g., a support plate, whereby the actuator too may be affixed to the support means. This allows for a simple and common assembly and contacting of both the actuator and the measuring means, in particular, without the spatial separation in some installations. In the weighing cycle the support means is spatially de-coupled to a large extent from the weighing container so that there is no interference affecting the measuring signals.

The level sensor may be designed in different ways. It may measure the distance of the bulk material to the sensor as a distance meter, e.g., as an optical distance meter, e.g., laser, or based on radar, in particular, radar distance meter, e.g., as direct or indirect time-of-flight measurement, and/or as ultrasound distance meter.

Some embodiments of the filling level sensor are a capacitive and/or inductive design, in particular, by determining changes of a capacity depending on the filling level or, respectively, inductively by measuring an inductivity which changes as a function of the filling level. A capacitive or inductive level sensor may also reliably detect from above, in particular, the bulk material lying below it even in the event of turbulence in the air stream, whereby these sensors can still be designed cost-efficiently and do not easily get dirty by the filling material. According to the present disclosure, preferably, such capacitive or inductive sensors may be affixed to the upper support plate and directed downwards, something that is not yet possible in this manner with the above-mentioned comparative systems with laterally provided sensors.

The controlling and detecting of the measuring signals as well as the initiation of the cycles is carried out by means of a controller means which detects the measured value of the filling level in the filling cycle and terminates the filling cycle upon reaching a threshold value of the filling level by closing a vacuum valve and triggering the actuator to open the weighing container at the top and at the bottom, thereby initiating the weighing cycle.

In the weighing cycle the measuring force signal is detected and evaluated. When the measuring force signal reaches a lower minimum value an empty weighing container is detected and the weighing cycle is terminated in that the weighing container is closed. The next filling cycle commences by subsequent opening of the vacuum valve.

According to one embodiment, the impact means is realized as an impact cone.

According to one embodiment, the impact means closes the lower outlet in an airtight manner.

According to a preferred embodiment, the actuator is a pneumatic actuating cylinder.

According to one embodiment, the upper guides are provided in the area of receptacles of weighing cells.

According to one embodiment, the level sensor is designed in accordance with one or more of the following embodiments:
  capacitive, in particular, by determining changes in a capacitance depending on the filling level,
  inductive, in particular, by measuring an inductance that changes depending on the filling level,
  as an optical distance meter, e.g., laser,
  as a radar, in particular, radar distance meter, e.g., as direct or indirect time-of-flight measurement,
  as an ultrasound distance meter.

According to one embodiment, the method comprises the steps an upwards adjustment of the impact means is carried out in a first partial motion of an actuator and, subsequently, the upwards adjustment of the weighing container is carried out in a second partial motion of the same actuator, in particular, in a continuous motion.

According to one embodiment, the bulk material is selected from the group consisting of plastic pellets, plastic granulate, and plastic flakes.

According to one embodiment, the bulk material is selected from the group comprising plastic pellets, plastic granulate, and plastic flakes.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Weighing and transporting devices of this type serve, in particular, to draw in granulated bulk material, e.g., plastic granulate or plastic pellets, determine the mass flow rate and discharge the bulk material continuously towards a downstream transport region of a production machine. The transport region of the production machine transports received bulk material continuously, e.g., towards the extruder which subsequently extrudes the plastic product.

Hereby, for one thing, a continuous output of the bulk material towards the transport region should be provided, so that there is no interruption in the production process. Moreover, the mass flow rate as masse per time unit should be determined with sufficed accuracy in order to adjust the production parameters with precision.

For this purpose, comparative weighing and transporting devices comprise an upper vacuum feeder with a material separator in which a vacuum is created via a vacuum connection so that an air stream with bulk material is fed to the material separator via a material suction coupling. The bulk material can become deposited in the material separator and is fed downwards to a storage container. Hereby a level sensor is provided in the material separator which measures the filling level so that the vacuum transport is terminated when a filling level threshold is reached. This causes the vacuum in the material separator to collapse so that an outlet flap kept closed by the vacuum opens by virtue of the weight of the bulk material resting on top of it. Subsequently, the bulk material is discharged into the storage container and from there via, e.g., a spiral hose downwards to a weighing means with a weighing container. In the weighing means the weight of the weighing container with the bulk material contained therein is continuously measured thereby determining the mass flow rate as mass per time unit.

This results in an accordingly high build caused by the vacuum feeder, the downstream storage container, and the weighing means with the weighing container. In come production facilities, however, the space available is at a premium so that it may be a problem to position the weighing and transport device. Thus, when the available space is small, a continuous gravimetry may possibly not be use. However, it is generally viewed as problematic to position the weighing and transport device at a greater distance from the production machine because, when there are longer transport regions to the production machine, the measuring accuracy is reduced and re-segregations of the mixed material may occur.

The present disclosure is based on the object of creating a weighing and transport device and a method for transporting and detecting mass flow rates of bulk material allowing for vacuum conveying as well as a precise weighing of the bulk material.

This task is solved by a weighing and transport device and a method according to the independent claims. The subclaims specify preferred further developments. The method according to the present disclosure may be carried out, in particular, using a weighing and transport device according to the present disclosure.

Thus, according to the present disclosure, a weighing container enclosing a weighing container volume is closable at its upper inlet and lower outlet. At the upper end of the so closable weighing container the vacuum connection and the material suction coupling are connected. In the filling cycles the air stream with bulk material is fed, with the weighing container volume closed, directly to the weighing container volume. Thus, the weighing container itself is also used as receiving container or receptacle respectively (or "separator") for receiving the transported air stream with the bulk material.

To initiate a filling cycle the weighing container is closed at its upper inlet and lower outlet. Thereafter, in the filling cycle, the weighing container is filled with the bulk material up to a point where a suitable filling level is reached. Subsequently, the filling cycle is terminated and the weighing cycle is initiated. To initiate the weighing cycle the lower outlet and the upper inlet are opened so that the weighing container can subsequently discharge the contained bulk material continuously downwards, where it will be discharged via the impact means to a collecting hopper and from this to the transport region, e.g., directly to a barrel extruder or an upstream screw conveyor.

Thus, using the present disclosure, a few advantages are attained:

Thus, the weighing and transport device is small in size, in particular, in the vertical direction significantly smaller than comparative systems in which a storage container and suction conveyor system are mounted above the weighing device. The vacuum conveyor, which may be formed in the upper region, with a receiving container or material separator container respectively is combined functionally or integrated respectively with the downstream storage container and weighing container. This makes it possible to use it even in confined spaces, e.g., next to the extruder, so that a short feeding path to the extruder is made possible thereby providing a precise determination of mass throughput.

Moreover, a rapid change of materials is made possible because it is only the weighing container with downstream collecting hopper that is being filled. While, comparatively, the filled material separator container, storage container, and weighing container should be emptied first, according to the present disclosure, it is possible to directly empty the weighing container with the collecting hopper and, e.g., another material can be fed in. This also allows, e.g., for a quicker change of colors, i.e., a change of the fed-in dye. Thus, corrections, e.g., in coloring can be carried out faster. This allows for a high degree of flexibility both in positioning as well as in material throughput.

Moreover, the technical equipment is smaller due to the omission of additional stages.

For closing the upper inlet and the lower outlet of the weighing container an actuator is provided. In principle, the actuator may be designed multi-piece and close the upper inlet using one actuator means and the lower outlet using a further actuator means. The actuator initially causes a relative adjustment, whereby, in particular, one closing means each may be adjusted at the top and/or at the bottom, and/or the weighing container may be adjusted upwards and/or downwards in relation to the closing means. Thus, it is possible, e.g., to also adjust the weighing container downwards so as to block the lower outlet.

According to a preferred embodiment, a closing means is moved from below against the lower outlet, and then the weighing container with the closing means is adjusted upwards.

According to an advantageous further development, the impact means, e.g., an impact cone, is moved directly vertically against the lower outlet of the weighing container so that no additional closing means should be employed here. Thus, it is possible, in particular, to also use the actuator for this adjustment which anyway serves for adjusting an outlet gap between the lower outlet and the impact means and thereby, e.g., for adjusting for differing material shapes and sizes, e.g., granulate, flakes etc.

According to a preferred embodiment, the weighing container is moved directly vertically upwards against a seal, in particular, a casket at an upper support means, thereby closing its upper inlet in a sealing manner.

According to a particularly preferred embodiment, the actuator of the impact means causes a common adjustment both of the impact means against the lower outlet and the weighing container upwards against the upper abutment at the support means. Hereby, in particular, a consistent adjustment motion of the actuator can be carried out, which initially moves the impact means against the lower outlet and subsequently presses the impact means with the material container upwards against the support means. Thus, only the common actuator, e.g., a pneumatic actuating cylinder, needs to be triggered to adjust into the filling position. Thus, quick and secure adjustment is made possible at little additional expense, in particular, by means of the actuator used anyway to adjust the outlet gap.

The actuator preferably actuates a drawbar which is guided from above through the support means vertically through the weighing container to the impact means, thus initially pressing the impact means against the lower outlet and subsequently taking along the weighing container.

As measuring signals, for one thing, a measuring force of weighing cells is detected whose temporal changes can be evaluated as material throughput during the weighing cycle. To that end, the measuring cells housed at the support means may directly weigh the material container. Further, the measuring signal of a filling level sensor is detected which is formed, in particular, at the underside of the support means thereby detecting the filling level in the weighing container from above. Thus, both measuring means, the weighing cells and the level sensor, can be housed directly at the support means, e.g., a support plate, whereby the actuator too may be affixed to the support means. This allows for a simple and common assembly and contacting of both the actuator and the measuring means, in particular, without the spatial separation in comparative installations. In the weighing cycle the support means is spatially decoupled to a large extent from the weighing container so that there is no interference affecting the measuring signals.

The level sensor may be designed in different ways: thus, it may measure the distance of the bulk material to the sensor as a distance meter, e.g., as an optical distance meter, e.g., laser, or based on radar, in particular, radar distance meter, e.g., as direct or indirect time-of-flight measurement, and/or as ultrasound distance meter.

Particularly preferred embodiments of the filling level sensor are a capacitive and/or inductive design, in particular, by determining changes of a capacity depending on the filling level or, respectively, inductively by measuring an inductivity which changes as a function of the filling level. A capacitive or inductive level sensor may also reliably detect from above, in particular, the bulk material lying below it even in the event of turbulence in the air stream, whereby these sensors can still be designed cost-efficiently and do not easily get dirty by the filling material. According to the present disclosure, preferably, such capacitive or inductive sensors may be affixed to the upper support plate and directed downwards, something that is not yet possible in this manner with the above-mentioned comparative systems with laterally provided sensors.

The controlling and detecting of the measuring signals as well as the initiation of the cycles is carried out by means of a controller means which detects the measured value of the filling level in the filling cycle and terminates the filling cycle upon reaching a threshold value of the filling level by closing a vacuum valve and triggering the actuator to open the weighing container at the top and at the bottom, thereby initiating the weighing cycle.

In the weighing cycle the measuring force signal is detected and evaluated. When the measuring force signal reaches a lower minimum value an empty weighing container is detected and the weighing cycle is terminated in that the weighing container is closed. The next filling cycle commences by subsequent opening of the vacuum valve.

According to a preferred embodiment, the impact means is realized as an impact cone.

According to a preferred embodiment, the impact means closes the lower outlet in an airtight manner.

According to a preferred embodiment, the actuator is a pneumatic actuating cylinder.

According to a preferred embodiment, the upper guides are provided in the area of receptacles of weighing cells.

According to a preferred embodiment, the level sensor is designed in accordance with one or more of the following embodiments:
  capacitive, in particular, by determining changes in a
    capacitance depending on the filling level,
    inductive, in particular, by measuring an inductance
      that changes depending on the filling level,
    as an optical distance meter, e.g., laser,
    as a radar, in particular, radar distance meter, e.g., as
      direct or indirect time-of-flight measurement,
    as an ultrasound distance meter.

According to a preferred embodiment, the method comprises the steps an upwards adjustment of the impact means is carried out in a first partial motion of an actuator and, subsequently, the upwards adjustment of the weighing container is carried out in a second partial motion of the same actuator, in particular, in a continuous motion.

According to a preferred embodiment, the bulk material is selected from the group consisting of plastic pellets, plastic granulate, and plastic flakes.

According to a preferred embodiment, the bulk material is selected from the group comprising plastic pellets, plastic granulate, plastic flakes, and combinations thereof.

Figure 6:
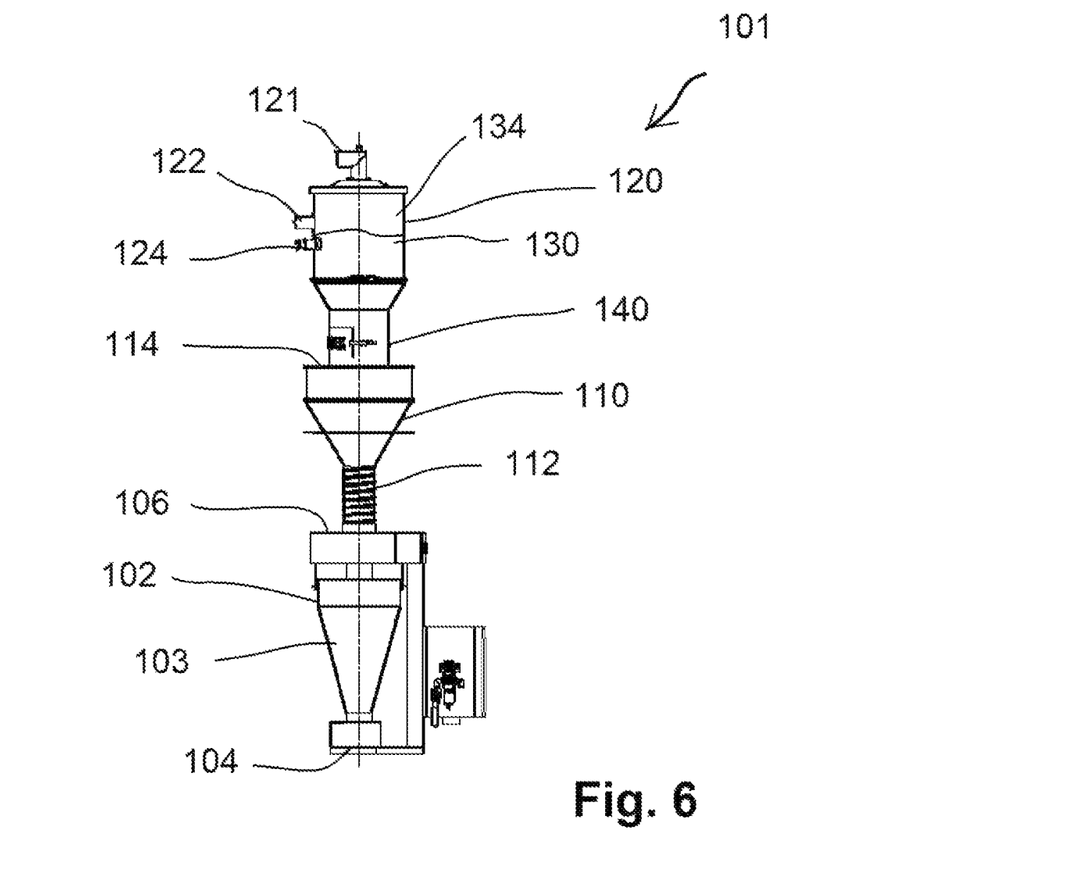
FIG. 6 shows a comparative weighing and transporting device.

FIG. 6 shows a weighing and transporting device 101 according to the state of the art which is provided for detecting a mass throughput of a granular bulk material 130. At its bottom the weighing and transporting device 101 comprises a scales 102 with a weighing container 103 which tapers conically from its upper inlet 106 towards its lower outlet 104.

Above the scales 102 a storage container 110 is provided, at the lower end of which a flexible hose, e.g., a spiral hose 112, leads to the inlet 106 of the scales 102. A vacuum conveyor 120 feeds the granular bulk material to an upper inlet 114 of the storage container 110, the conveyor in turn comprising a receiving container 134 with a vacuum connection 121 for connecting to a vacuum generator, a material suction coupling 122 and a level sensor 124.

In the vacuum conveyor 120 a vacuum is created via the vacuum connection 121 by means of which an airstream with the bulk material is aspirated from a storage container via the material suction coupling 122. The bulk material 130 is received in the material separator formed above the storage container 110, deposits in the receiving container 134, and deposits at the bottom end of the vacuum conveyor 120 in the end region 140 designated for this purpose, from where the bulk material 130 then drops into the storage container 110. In filling cycles, a shut-off element provided below the spiral hose 112, i.e. in the scales inlet, opens so that the bulk material drops from the storage container and the spiral hose into the weighing container 103. The weighing container 103 continuously discharges the bulk material 130 downwards via its lower outlet 104 where the material is mixed or distributed by an impact cone and, e.g., subsequently reaches a collecting hopper from which it is then carried along by a screw conveyor or directly by an extruder.

Thus, the weighing and transporting device 101 according to the state of the art exhibits a correspondingly high build with a corresponding number of parts.

Figure 5:
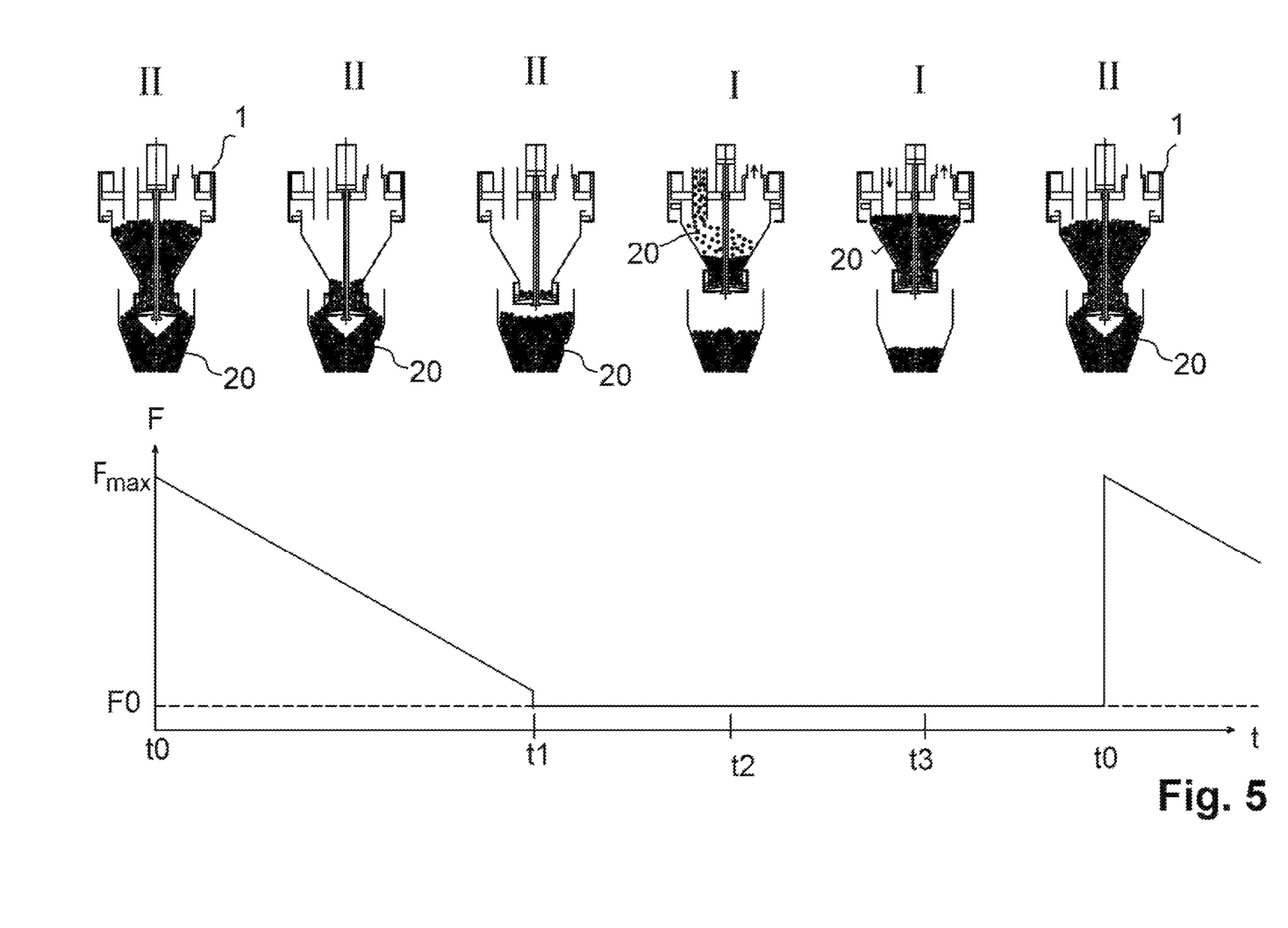
FIG. 5 shows is a time diagram of the successive cycles.

The FIGS. 1 through 4 as well as the measuring diagram of FIG. 5 show an embodiment of the invention. A weighing and transporting device 1 comprises a support plate 3 with weighing cells 4 as well as a weighing container 5 provided below the support plate 3. The weighing container 5 comprises an upper inlet 6 and tapers in its middle region 5b conically downwards towards its lower cylindrical region 5c with its lower outlet 7.

Figure 1:
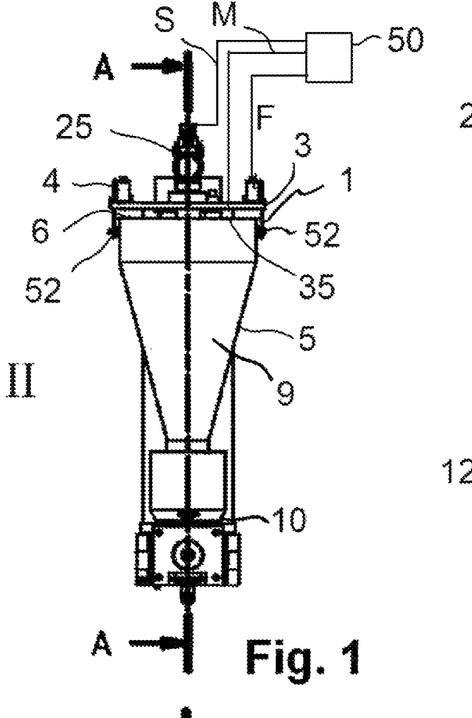
FIG. 1 shows a weighing and transporting device according to an embodiment of the present disclosure in a weighing cycle.
Figure 2:
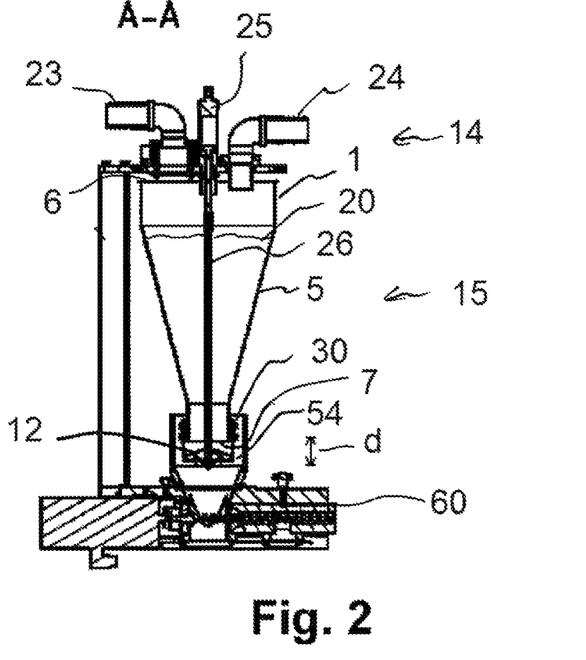
FIG. 2 shows the weighing and transporting device from FIG. 1 at section A-A.

In the area of the lower outlet 7 an impact cone 12 for distributing or mixing respectively of the dropping bulk materials 20 is provided at the weighing container 5; a collecting hopper 10 is provided below the lower outlet 7.

At the support plate 3 a vacuum connection 23 for connecting to a vacuum line 33 and a material suction coupling 24 for connecting a material suction intake line 34 are provided. Further, a pneumatic cylinder 25 is attached to the support plate 3 which vertically adjusts a drawbar 26. The drawbar 26 extends downwards through the weighing container 5 and receives the vertically adjustable impact cone 12 which can be adjusted upwards against the lower outlet 7 of the weighing container 5. The weighing container 5 in turn is guided in a vertical adjustable manner, e.g., through a guide through upper brackets provided in the region of the receptacles 52. Further, a slide bearing may be provided for guiding the impact cone 12 upon opening or closing.

Figures 3, 4:
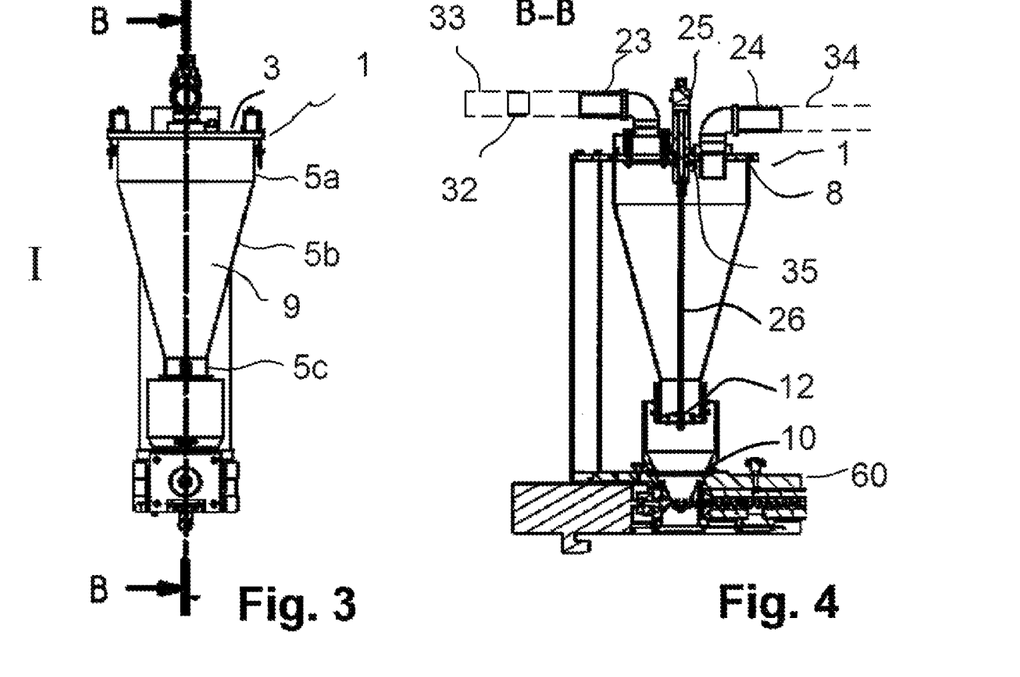
FIG. 3 shows weighing and transporting device from FIGS. 1, 2 in a filling cycle.
FIG. 4 shows the weighing and transporting device from FIG. 3 at section B-B.

FIGS. 3 and 4 show the weighing and transporting device 1 in the filling cycle I of the weighing container 5. The filling cycle I is initiated in FIG. 5 at time t2. To initiate the filling cycle I a controller means 50 shown in FIG. 1 triggers the pneumatic cylinder 25 so that it pulls up the drawbar 26 with the impact cone 12 provided at the lower end of the drawbar 26. Thus, the impact cone 12 is moved against the lower outlet 7 of the weighing container 5 closing the same. Thereafter, the weighing container 5 is pulled up and its upper edge or, respectively, upper inlet 6 is pressed against a gasket 8 at the underside of the support plate 3. Thus, the weighing container volume 9 of the weighing container 5 is closed by the support plate 3 and the impact cone 12 and is now connected to the exterior space only via the vacuum connection 23 and the material suction coupling 24.

Thereafter, the controller means 50 triggers a vacuum valve 32 provided in the vacuum line 33 feeding a vacuum required for suction conveyance to the vacuum connection 23 and thereby into the weighing container volume 9, so that via the material suction coupling 24 and the material suction intake line 34 a bulk material airstream is aspirated from a material reservoir and moved into the weighing container volume 9 where the bulk material 20 deposits.

In the filling cycle I, the filling level of the bulk materials 20 in the weighing container 5 is detected via a filling level sensor 35 provided at the support plate 3. The filling level sensor 35 is able to detect the filling level, i.e. the upper edge of the received bulk material 20, using different measuring principles, e.g. optically, radar filling level sensors, by means of ultrasound, as well as, in particular, by capacitive or inductive means. The controller means 50 receives the measuring signal M of the filling level sensor 35 and compares the so determined filling level to a maximum filling level M-max. At time t3 of FIG. 5 the filling level F reaches the maximum filling level M-max, whereupon the controller means 50 terminates the filling cycle I and initiates the weighing cycle II by first closing the vacuum valve 32 thereby ending vacuum transport. Subsequently, the controller means 50 controls the pneumatic cylinder 25 in such a way that the drawbar 26 with the impact cone 12 and the weighing container 5 are moved downwards back into its starting position shown in FIGS. 1, 2. In order for the impact cone 12 and the weighing container 5 to stresslessly reach their correct end position these are, advantageously, guided in the vertical direction using pins and slots. Thus, the weighing cycle II stops at time t1.

The weighing container 5 hangs in receptacles 52 of the weighing cells 4, which measure the weight of the weighing container 5 with the bulk material 20 during the weighing cycle II and output a measuring force signal F to the controller means 50. A defined, circumferential discharge gap 54 is formed between the lower outlet 7 of the weighing container 5 and the impact cone 12. The height of the discharge gap 54 or, respectively, the outlet distance d is preferably set prior to the transport process depending on the bulk material, e.g., depending on the diameter of the particles of the bulk material such as, e.g., flakes, granulate, grains etc.

In the weighing cycle II, the bulk material 20 contained in the weighing container 5 drops down through the lower outlet 7 against the impact cone 12, whereby the bulk material 20 is mixed. Subsequently, the bulk material 20 is moved to the collecting hopper 10 and further down to a transport region 60, where this transport region 60 may be formed by an additional screw conveyor, or directly by the extruder screw so that the bulk material 20 stored here can be processed continuously. The weighing cells 4 continuously measure the weight and are therefore able to detect the weight loss or, respectively, the material stream as masse per unit of time.

In the position for the weighing cycle II shown in FIG. 1, 2, the pneumatic cylinder 25 is not under load from the drawbar 26; the weighing container 5 with the impact cone 12 only hangs in the receptacles 52 of the weighing cells 4. Thus, the measuring result is not affected by the pneumatic cylinder 25 and the drawbar 26. Because, during the filling cycle I, the lower outlet 7 of the weighing container 5 is closed and no material can be discharged, a sufficiently dimensioned collecting hopper 10 is provided to bridge the period for the filling cycle I provided for filling. This so buffers enough material or bulk material 20 respectively, to guarantee uninterrupted supply at times t2 and t3 in FIG. 5. This guarantees a continuous feed of the bulk material 20 towards the transport region 60 and, thereby, an uninterrupted supply of the extruder or the processing machine respectively.

In the diagram of FIG. 5, the measuring force F measured by the weighing cells 4 is shown as a function of time t. Upon initiation of the weighing cycle II at time to a maximum measuring force Fmax is measured. Thereafter, the bulk material 20 drops from the weighing container 5 through the discharge gap 54 down into the collecting hopper 10 so that the measuring force F decreased up until time t1. The controller means 50 detects that the measuring force F reaches an empty weight F0 or minimum weight respectively, thereby determining the end of the weighing cycle II. Subsequently, the controller means 50 again initiates the next filling cycle I in which it is not the measuring force F that is relevant, but the filling level is measured so as to subsequently terminate the filling cycle.

LIST OF REFERENCE NUMERALS 1 weighing and transporting device
3 support plate
4 weighing cells
5 weighing container
5b conical middle section of the weighing container 5
5c lower cylindrical section with the lower outlet 7
6 upper inlet of the weighing container 5
7 lower outlet of the weighing container 5
8 gasket at the underside of the support plate 3
9 weighing container volume
10 collecting hopper
12 impact cone
14 vacuum conveyor
15 weighing region
20 bulk material
23 vacuum connection
24 material suction coupling
25 pneumatic cylinder, actuator
26 drawbar
30 slide bearing
32 vacuum valve
33 vacuum line
34 material suction intake line
35 filling level sensor
50 controller means
52 receptacle of the weighing cells 4 at the weighing container 5
54 discharge gap
60 transport region, e.g. screw conveyor or extruder
F measuring force signal, weighing signal
Fmax maximum weight
F0 empty weight
M filling level
Mmax maximum filling level
DM mass flow rate
d outlet distance
t time
101 weighing and transporting device
102 scales
103 weighing container 104 outlet of the scales 102
106 inlet of the scales 102
112 spiral hose
110 storage container
114 inlet of the storage container 110
140 end region
120 vacuum conveyor
121 vacuum connection
122 material vacuum connection
124 level sensor
130 bulk material
134 receptacle container, material separator

The invention claimed is:

1. A weighing and transporting device for detecting mass flow rates of bulk material and discharging bulk material, comprising:
a weighing container having an upper inlet for receiving the bulk material and a lower outlet for discharging the bulk material,
at least one weighing cell for measuring the weight of at least the weighing container with bulk material contained therein and for discharging a measuring force signal,
a vacuum conveyor region having a vacuum connection for connecting to a vacuum line and a material suction coupling for connecting a suction intake line for an airstream with bulk material contained therein,
a level determining means for determining a filling level of the bulk material in the weighing container and outputting a filling level signal,
at least one actuator for closing the upper inlet and the lower outlet, and
a controller means, being designed to receive the measuring force signal and the filling level signal and to control the at least one actuator for adjusting between a filling position with closed upper inlet and closed lower outlet of the weighing container and a weighing position with open upper inlet and open lower outlet of the weighing container,
wherein an impact means is provided below the lower outlet for distributing or mixing the bulk material,
the impact means being adjustable by means of the actuator between
its lower position in the weighing position for a weighing cycle in which a discharge gap is formed between the lower outlet and the impact means, and
its upper position in the filling position for a filling cycle in which the impact means closes the lower outlet,
wherein the weighing container is vertically adjustable between its lower weighing position in which it is spaced apart from a support means, and its upper filling position in which its upper inlet and/or its upper edge lies in sealing contact with the support means, the common actuator being designed and controllable to adjust
the impact means against the lower outlet in a first partial motion and
subsequently the impact means with the weighing container upwards against the support means in a subsequent second partial motion of the actuator,
wherein the filling position the impact means closes the lower outlet and the support means closes the upper inlet of the weighing container in a sealing manner.

2. The weighing and transporting device of claim 1, wherein the actuator is connected via a drawbar extending vertically downwards through the weighing container to the impact means, and the impact means is vertically adjustable upwards via the drawbar.

3. The weighing and transporting device of claim 1, wherein it comprises a collecting hopper which is arranged, at least in part, below the lower outlet, and which is further designed to receive bulk material falling out of the lower outlet and to forward it to its lower discharging outlet.

4. The weighing and transporting device of claim 1, wherein the controller means is designed and configured, depending upon at least the filling level signal of the level determining means and the measuring force signal
(I) to output control signals for initiating a filling cycle to the at least one actuator for closing the lower outlet and the upper inlet of the weighing container, thereby creating an enclosed weighing container volume to be filled via the material suction coupling,
and, subsequently, to a vacuum valve for opening a vacuum line provided at the vacuum connection,
(II) and, for initiating a weighing cycle, to output control signals to
the vacuum valve for closing the vacuum line,
and, subsequently, to the at least one actuator for opening the weighing container at its lower outlet and its upper inlet.

5. The weighing and transporting device of claim 1, wherein in the filling position the weighing container volume formed in the weighing container is connected to outside spaces merely via the vacuum connection and the material suction coupling.

6. The weighing and transporting device of claim 1, wherein the weighing container is stressless vertically adjustable in upper guides.

7. The weighing and transporting device of claim 1, wherein the controller means is further designed and adapted to adjust the discharge gap for controlling the mass throughput, depending upon a mass throughput determined from the measuring force signal and by controlling the actuator.

8. The weighing and transporting device of claim 1, wherein one or more weighing cells are provided at the support means receiving the weighing container via receptacles.

9. The weighing and transporting device of claim 1, wherein the material suction coupling extends through the support means and, at least in part, into the weighing container, for direct filling of the weighing container without an upstream storage container.

10. The weighing and transporting device of claim 1, wherein the weighing container tapers, at least in certain regions, from its upper inlet towards its lower outlet.

11. The weighing and transporting device of claim 10, wherein the weighing container comprises
a conically tapering area, tapering in the downwards direction, in a middle region, and
a cylindrical area provided below the conical area,
the weighing container being guided with its lower cylindrical area in the collecting hopper.

12. The weighing and transporting device of claim 1, wherein the support means comprises a support plate at which one or more of the following elements are provided: the level determining means, at least one weighing cell, the vacuum connection, the material suction coupling, the actuator, and a gasket for sealing the upper inlet of the weighing container.

13. The weighing and transporting device of claim 1, wherein the level determining means is designed in accordance with one or more of the following embodiments:

capacitive, in particular, by determining changes in a capacitance depending on the filling level,
inductive, in particular, by determining an inductance that changes depending on the filling level,
as an optical distance meter, e.g., laser,
as a radar, in particular, radar distance meter, e.g., as direct or indirect time-of-flight measurement,
as an ultrasound distance meter.

14. A system comprising:
a weighing and transporting device according to one of the preceding claims,
a vacuum line comprising a vacuum valve,
a material feeder line being guided in a material container, the material container containing the bulk material,
a transport region being provided below the weighing and transporting device, and
a production machine.

15. A method for transporting and detecting mass flow rates of bulk material, wherein
in alternating filling cycles and weighing cycles bulk material is received in a weighing and transporting device with a weighing container, subsequently detected, and subsequently put out to a transport region of a production machine,
wherein in the filling cycle
a vacuum is created in a weighing container volume of the weighing container,
an air stream with bulk material is sucked via a material suction coupling coupled to the weighing container volume so that the bulk material is deposited in the weighing container volume,
a filling level of the bulk materials is determined, and upon determination of a maximum filling level, the filling cycle is terminated, and
wherein in the weighing cycle
the bulk material moves continuously from the weighing container volume downwards via an impact means to the transport region of the production machine,
wherein, for adjusting to a filling position and for initiating the filling cycle, the lower outlet and the upper inlet of the weighing container are closed and subsequently a vacuum is applied to the vacuum connection,
wherein, for adjusting to a weighing position and for initiating the weighing cycle, the application of vacuum to the vacuum connection is terminated and subsequently the lower outlet and the upper inlet of the weighing container are opened,
wherein
when adjusting into the filling position,
the lower outlet is closed by vertical adjustment of the impact means in an upwards direction against the lower outlet, and/or
the upper inlet is closed by vertical adjustment of the weighing container in an upwards direction against a support means,
and, correspondingly, when adjusting into the weighing position,
the lower outlet is opened by vertical adjustment of the impact means in a downwards direction, thereby setting a discharge gap between the lower outlet and the impact means, and/or
the upper inlet is opened by vertical adjustment of the weighing container in a downwards direction.

16. The method of claim 15, wherein the upwards adjustment of the impact means is carried out in a first partial motion of an actuator and, subsequently, the upwards adjustment of the weighing container is carried out in a second partial motion of the same actuator.

17. The method of claim 16, wherein the first partial motion of an actuator and the second partial motion of the same actuator are carried out as a continuous motion.

18. The method of claim 15, wherein the material throughput is regulated by adjusting the discharge gap between the lower outlet and the impact means.

19. The method of claim 15, wherein the filling cycle and the weighing cycle are initiated automatically,
determining the filling level of the bulk material in the weighing container and measuring the measuring force and
controlling the actuator means and a vacuum valve.

20. The method of claim 15, wherein the bulk material is moved continuously from the weighing container volume downwards via the impact means into a collecting hopper and from a lower discharging outlet of the collecting hopper to the transport region of the production machine, and
wherein in the weighing cycle the collecting hopper is filled such that in the next following filling cycle the bulk material is discharged from the collecting hopper to the transport region continuously and without interruption until, in the next following weighing cycle, the collecting hopper is again filled with the bulk material.

21. A method of extruding an extrusion product, in which bulk material is continuously measured in its mass flow rate and fed to the transport region using the method according to claim 15, wherein in the transport region the received bulk material is continuously conveyed towards an extruder, where it is extruded.

22. The method of claim 21, wherein the extrusion is closed loop controlled or regulated by adjusting a discharge gap.

23. A weighing and transporting device for detecting mass flow rates of bulk material and discharging bulk material, comprising:
a weighing container having an upper inlet for receiving the bulk material and a lower outlet for discharging the bulk material,
at least one weighing cell for measuring the weight of at least the weighing container with bulk material contained therein and for discharging a measuring force signal,
a vacuum conveyor region having a vacuum connection for connecting to a vacuum line and a material suction coupling for connecting a suction intake line for an airstream with bulk material contained therein,
a level determining means for determining a filling level of the bulk material in the weighing container and outputting a filling level signal,
at least one actuator for closing the upper inlet and the lower outlet, and
a controller means, being designed to receive the measuring force signal and the filling level signal and to control the at least one actuator for adjusting between a filling position with closed upper inlet and closed lower outlet of the weighing container and a weighing position with open upper inlet and open lower outlet of the weighing container,
wherein an impact means is provided below the lower outlet for distributing or mixing the bulk material,
the impact means being adjustable by means of the actuator between
its lower position in the weighing position for a weighing cycle in which a discharge gap is formed between the lower outlet and the impact means, and its upper position in the filling position for a filling cycle in which the impact means closes the lower outlet, wherein the actuator is connected via a drawbar extending vertically downwards through the weighing container to the impact means, and the impact means is vertically adjustable upwards via the drawbar.

\* \* \* \* \*